United States Patent [19]

Horiya et al.

[11] Patent Number: 4,683,479
[45] Date of Patent: Jul. 28, 1987

[54] THERMAL PRINTER

[75] Inventors: Keiichi Horiya, Numazu; Kazuhide Takahama, Shizuoka; Yutaka Usami, Mishima, all of Japan

[73] Assignee: Tokyo Electric Co., Ltd., Tokyo, Japan

[21] Appl. No.: 837,074

[22] Filed: Mar. 6, 1986

[30] Foreign Application Priority Data

Mar. 12, 1985 [JP] Japan .................................. 60-48641

[51] Int. Cl.$^4$ .......................... G01D 15/10; B41J 3/10
[52] U.S. Cl. ................................ 346/76 PH; 400/120
[58] Field of Search ..................... 346/76 PH; 400/120

[56] References Cited

U.S. PATENT DOCUMENTS

| 4,224,628 | 9/1980 | Murray | 346/76 PH |
| 4,396,923 | 8/1983 | Noda | 346/76 PH |
| 4,542,384 | 9/1985 | Tazaui | 346/33 R |

*Primary Examiner*—E. A. Goldberg
*Assistant Examiner*—Gerald E. Preston

*Attorney, Agent, or Firm*—Frishauf, Holtz, Goodman and Woodward

[57] ABSTRACT

A thermal printer includes a thermal head having n heating elements arranged at a preset pitch D1 in a line, a memory including a first memory area storing a plurality of high speed printing character data each column of which is composed of n-bit data and a second memory area storing a plurality of high resolution printing character data each column of which is composed of m-bit data (m>n); and printing control circuit which reads out the m-bit data of each column designated by the input character code data from the second memory area in accordance with the high resolution printing mode designation data, and drives the thermal head in accordance with the m-bit data read out. The printing control circuit reads out the n-bit data of each column designated by the input character code data from the first memory area in accordance with the high speed printing mode designation data and converts this n-bit data into the N-bit data (N>n) and drives the thermal head at an average dot pitch D2 (D2 is larger than D1 and differs from the integer multiple of D1) in accordance with the N-bit data.

6 Claims, 8 Drawing Figures

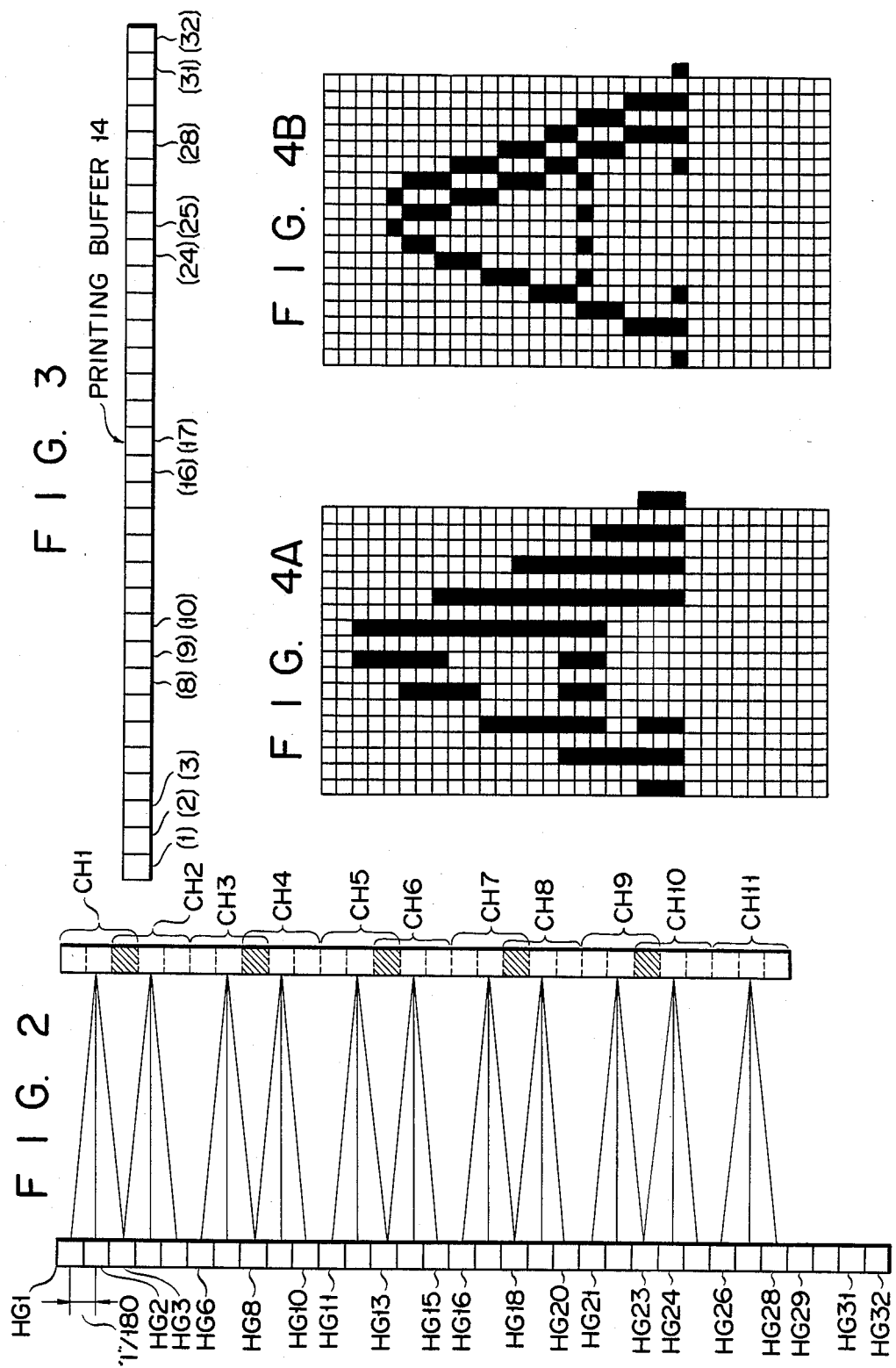

THERMAL PRINTER

BACKGROUND OF THE INVENTION

The present invention relates to a thermal printer which can be selectively set into a high resolution printing mode or a high speed printing mode.

Hitherto, in wire dot printers, the pitch between dots has been set to 1/72 inch and this pitch has generally been used in the world. Therefore, in most printers, it is required to set the lowest resolution of a graphic pattern which is printed into 1/72 inch.

On the other hand, in the printer such as a thermal printer which requires a high resolution, to realize the printing at the pitch of 1/72 inch between dots, it is necessary to set the dot pitch of the thermal head into a 1/72×n (n is an integer of 2 or more) inch, for example, 1/144, 1/216, or 1/288 inch. In this case, the number of heating elements which are used to constitute one dot increases with a decrease in n. When considering the practical use of the thermal printer, the high resolution characters printed by the thermal head having the heating elements which are arranged at the pitch of 1/144 inch between dots are slightly roughly observed. On the other hand, when the thermal head having the heating elements arranged at the pitch of 1/216 inch between dots is used, the high resolution characters having a high near-letter-quality can be printed with a high degree of fidelity. However, since it is necessary to arrange a number of heating elements in the limited space, it is difficult to manufacture such a kind of thermal head and its circuit arrangement also becomes complicated. Therefore, it is considered that it is advantageous to arrange the heating elements at the pitch of 1/180 inch between dots. Namely, it is desirable to perform the high density printing or high resolution printing at the dot pitch of 1/180 inch and execute the ordinary high speed printing at the dot pitch of 1/72 inch. However, hitherto, it has been considered that in the case where the dot pitch of 1/180 inch is used for the high density printing, only the dot pitch of 1/190 or 1/60 inch can be used for the high speed printing. Therefore, it has been considered that two sets of thermal heads are prepared and used by switching as necessary in order to effect the printing at the dot pitch of 1/180 or 1/72 inch. The use of two sets of thermal heads, however, is disadvantageous in terms of costs and causes the structure of printer to become complicated.

SUMMARY OF THE INVENTION

It is an object of the present invention to provide a thermal printer which can execute the ordinary printing at a dot pitch different from the dot pitch which is integer times as large as the dot pitch for use in the high resolution printing.

This object is accomplished by a thermal printer comprising: a data generator for generating character code and printing mode designation data; a thermal head having a plurality of heating elements arranged with a predetermined pitch D1 in a line; a memory including a first memory area in which a plurality of high speed printing character data each column is composed of n-bit data are stored and a second memory area in which a plurality of high resolution printing character data each column of which is composed of m-bit data (m>n) are stored; and a printing control unit which reads out the m-bit data of each column from the second memory area in accordance with the input character code in the case where the printing mode designation data designates the high resolution printing mode, selectively energizes the heating elements of the thermal head in accordance with the m-bit data read out, and executes a high resolution printing, and also reads out the n-bit data of each column from the first memory area in accordance with the input character code in the case where the printing mode designation data designates the high speed printing mode, converts the n-bit data into the N-bit data (N is larger than n) corresponding to the n-bit data, selectively energizes the heating elements of the thermal head in accordance with the N-bit data, and executes a high speed printing with an average pitch D2 (D2 is larger than D1 and different from the integer multiple of D1) between adjacent dots.

According to the invention, the n-bit data read out from the memory is converted into the N-bit data in the high speed printing mode. Therefore, the mean value of the pitch between dots in high speed printing mode can be set to be different from the integer multiple of the dot pitch in the high resolution printing mode.

BRIEF DESCRIPTION OF THE DRAWINGS

FIG. 2 is a diagram showing the relations between a plurality of heating elements which are used in the high resolution printing mode and a plurality of composite heating elements which are each formed of three heating elements and are used in the high speed printing mode;

FIG. 3 shows a printing buffer which is used in the thermal printer shown in FIG. 1;

FIGS. 4A and 4B show character "A" printed in the high speed printing mode and in the high resolution printing mode, respectively;

DETAILED DESCRIPTION OF THE PREFERRED EMBODIMENTS

Figure 1:
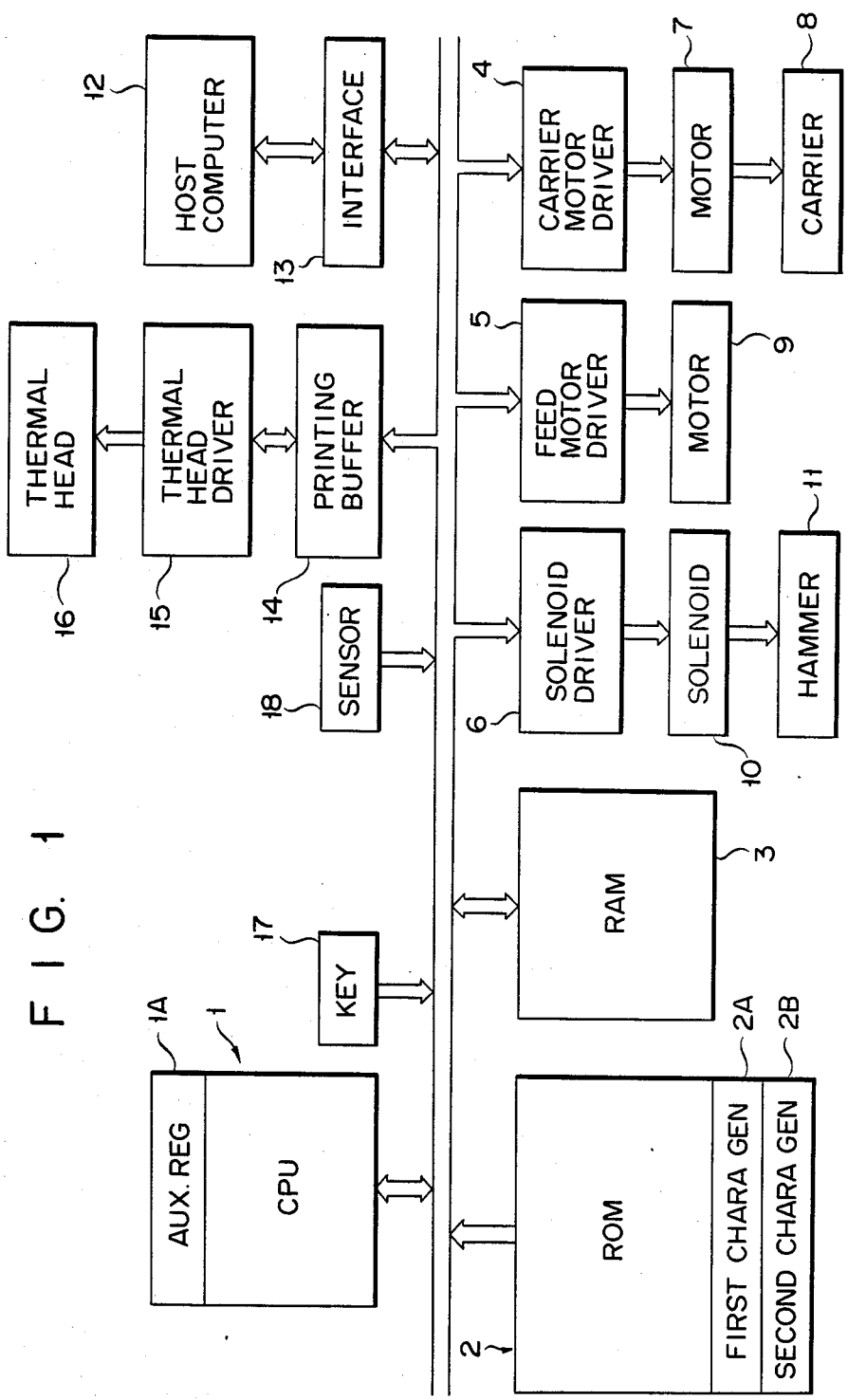
FIG. 1 is a block diagram of a thermal printer according to an embodiment of the present invention.

FIG. 1 is a block diagram of a thermal printer according to an embodiment of the present invention. This thermal printer comprises a central processing unit (CPU) 1 including an auxiliary register 1A therein, a read only memory (ROM) 2 in which a control program of CPU 1 is stored, and a random access memory (RAM) 3 for temporarily storing print data or the like. ROM 2 includes 11-bit and 32-bit character generators 2A and 2B. Character generators 2A and 2B have a plurality of character data constructed by 11 bits×10 columns and 32 bits×19 columns, respectively. Further, CPU 1 is connected to a carrier motor driver 4, a paper feed motor driver 5, and a solenoid driver 6. Carrier motor driver 4 drives a carrier motor 7 to drive a carrier 8. Feed motor driver 5 drives a paper feed motor 9 to transfer a printing paper. Solenoid driver 6 drives a solenoid 10 to drive a printing hammer 11.

CPU 1 is also connected to a host computer 12 through an interface 13 and to a 32-bit printing buffer 14 for temporarily storing printing data. Printing buffer 14 is connected to a thermal head driver 15 to drive a thermal head 16 having thirty-two heating elements according to the content of buffer 14.

CPU 1 is further connected to a key 17 for setting the printing mode and a ribbon end sensor 18. Key 17 can be constituted by, for example, two key switches which are set at different switching positions, or by a single key switch to designate the printing mode in dependence on the ON-OFF state. Ribbon end sensor 18 is constituted by, for example, a photoelectric converter for generating an output signal responsive to a ribbon end mark as is well known.

FIG. 2 shows the relations between thirty-two heating elements $HG_1$ to $HG_{32}$ of the thermal head 16 which are arranged in a straight line at the dot pitch of 1/180 inch and eleven composite heating elements $CH_1$ to $CH_{11}$ which are constituted by properly combining heating elements $HG_1$ to $HG_{32}$. As will be obvious from FIG. 2, composite heating elements $CH_1$ to $CH_{11}$ are composed of heating elements $HG_1$ to $HG_3$, $HG_3$ to $HG_5$, $HG_6$ to $HG_8$, $HG_8$ to $HG_{10}$, $HG_{11}$ to $HG_{13}$, $HG_{13}$ to $HG_{15}$, $HG_{16}$ to $HG_{18}$, $HG_{18}$ to $HG_{20}$, $HG_{21}$ to $HG_{23}$, $HG_{23}$ to $HG_{25}$, and $HG_{26}$ to $HG_{28}$, respectively. Namely, each of heating elements $HG_3$, $HG_8$, $HG_{13}$, $HG_{18}$, and $HG_{23}$ is overlappingly used. Each of composite heating elements $CH_1$ to $CH_{11}$ is constituted by three of heating elements $HG_1$ to $HG_{28}$. The hatched portions represent the overlap portions of the adjacent composite heating elements. It should be noted that eleven composite heating elements $CH_1$ to $CH_{11}$ are formed from twenty-eight heating elements $HG_1$ to $HG_{28}$. Namely, since the dot pitch of heating elements $HG_1$ to $HG_{28}$ is 1/180 inch, the value of dot pitches DP regarding composite heating elements $CH_1$ to $CH_{11}$ is about 1/72 inch from the following expression.

$$DP = 28/11 \times 1/180 \approx 1/72$$

For example, the dot pitch between composite heating elements $CH_1$ and $CH_2$ is 1/90 inch and the dot pitch between composite heating elements $CH_2$ and $CH_3$ is 1/60 inch, so that the mean value of the dot pitches among composite heating elements $CH_1$ to $CH_3$ becomes 1/72 inch.

On the other hand, in the high resolution printing mode, the paper feed distance in each feeding cycle is set to a value which is 32 times as large as the size of the heating element. In the high speed printing mode, the paper feed distance is set to a value which is 28 times as large as the heating element. Thus, if a printing paper is fed by a distance of 32×1/180 inch in the high speed printing mode, it is prevented that the white line is generated between lines each time the printing line is changed in the case of printing a graphic pattern or the like.

CPU 1 detects whether the printing mode is set to the high speed printing mode "A" or high resolution printing mode "B" by key 17. CPU 1 selects one of character generators 2A and 2B in accordance with the designated printing mode and reads out the character data corresponding to the character code from host computer 12 from selected one of character generators 2A and 2B. The character data read out in this manner is stored into printing buffer 14 having thirty-two bit positions [1] to [32] as shown in FIG. 3. Thermal head driver 15 drives thermal head 16 in accordance with the character data in printing buffer 14 to print a character. The character which is designated by the input character code in this manner is printed in accordance with the printing mode designated by key 17.

FIGS. 4A and 4B show character "A" which is printed by the thermal printer shown in FIG. 1 in the high speed printing mode and in the high resolution printing mode, respectively. Carrier 8 is driven at the speed of 40 cps in the high resolution printing mode and at the speed of 70 cps in the high speed printing mode.

The operation of the thermal printer shown in FIG. 1 will then be described with reference to flowcharts shown in FIGS. 5 to 7.

Figure 5:
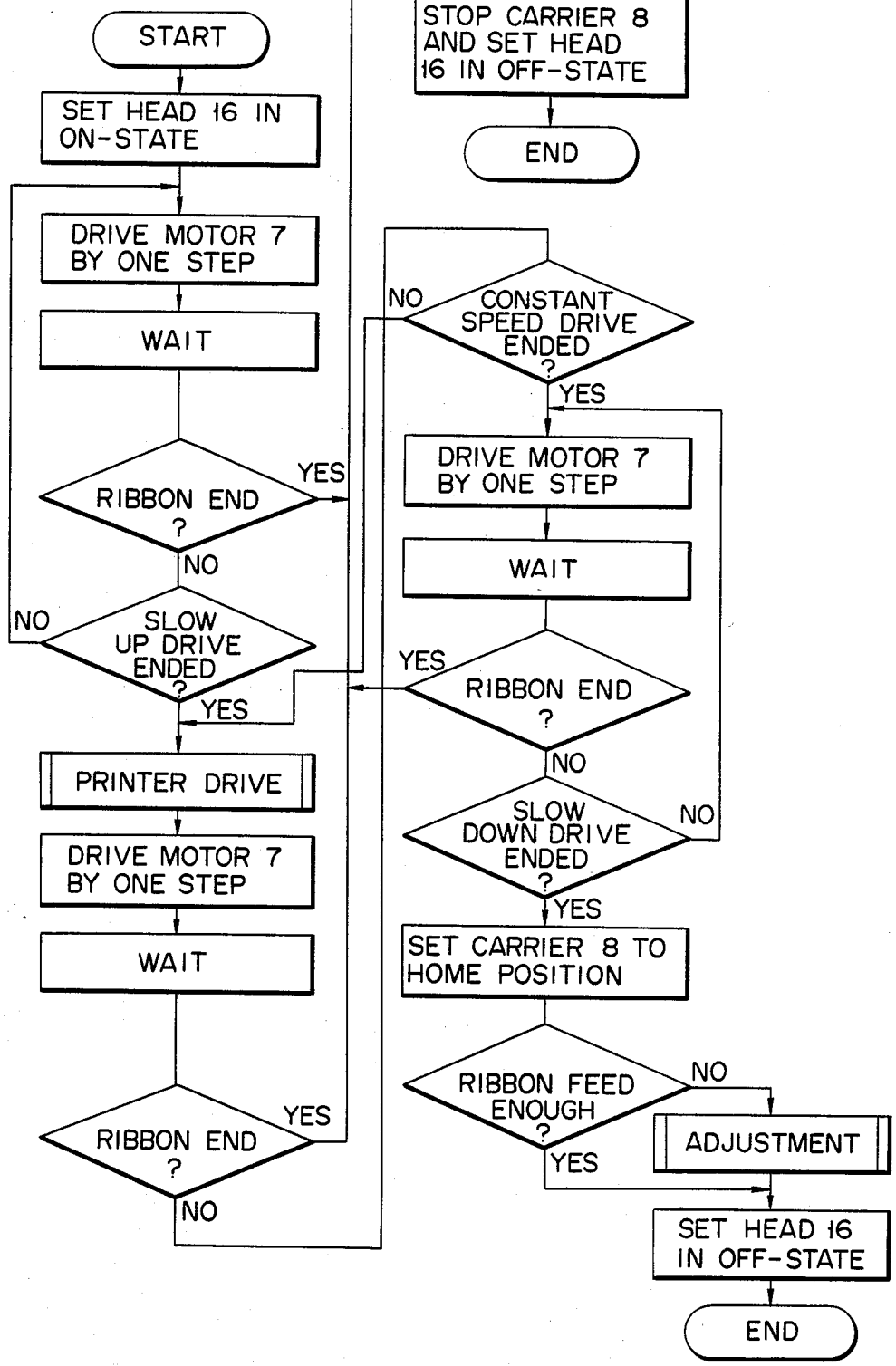
FIG. 5 is a flowchart for explaining the operation of the thermal printer shown in FIG. 1.

As shown in FIG. 5, thermal head 16 is first set in ON-state in the printing operation mode. Thereafter, carrier 8 on which thermal head 16 is mounted is driven in accordance with the slow-up routine, constant speed routine, and slow-down routine which are preliminarily programmed. Namely, in the slow-up routine, carrier 8 is slowly driven until it is accelerated to a preset speed and then driven at the constant speed equal to this preset speed. Thereafter, carrier 8 is slowly decelerated on the basis of the slow-down routine. In the high resolution and high speed printing modes, CPU 1 gives drive data to carrier motor driver 4 so as to drive carrier 8 at the constant speed of 40 cps and 70 cps in the constant speed routine, respectively. In each routine, the ribbon end is checked. In response to an output signal from ribbon sensor 18. When the ribbon end is detected, carrier 8 is stopped and thermal head 16 is set in OFF-state. While carrier 8 is being driven at the constant speed in accordance with the constant speed routine, thirty-two heating elements in thermal head 16 are selectively energized on the basis of the character data which is printed. After completion of the slow-down routine, carrier 8 is set to the home position and a check is made to see if there is a slack of ribbon or not. If there is a slack, the ribbon is adjusted to eliminate the slack and thermal head 16 is set in the OFF-state.

Figure 6:
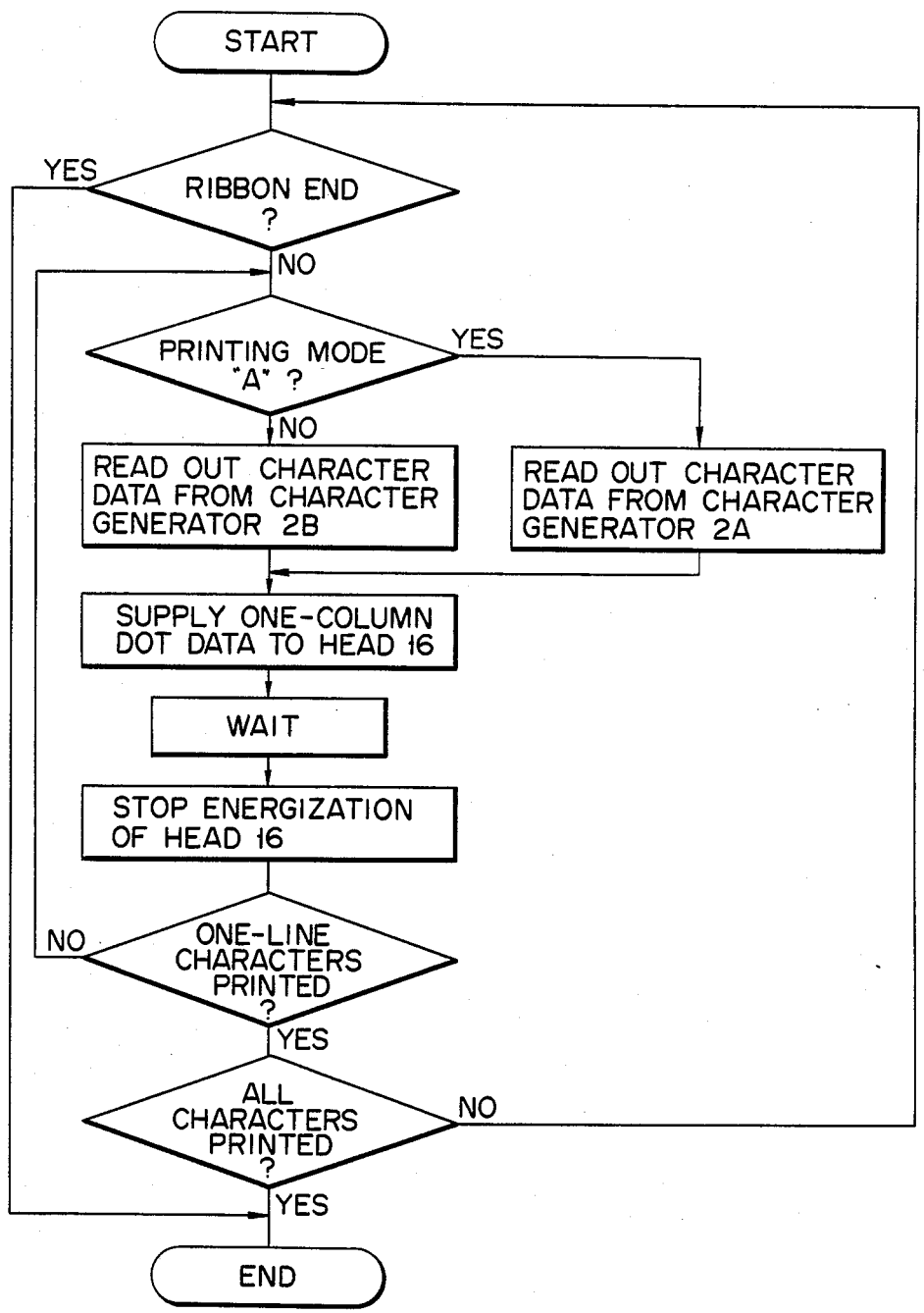
FIG. 6 is a flowchart for explaining the printing routine in the flowchart shown in FIG. 5.

FIG. 6 is a flowchart showing the printing operation. To execute the printing operation, CPU 1 first checks to see if the printable ribbon exists or not and then checks the printing mode. If CPU 1 detects by the state of key 17 that the high speed printing mode "A" has been set, CPU 1 reads out the 11-bit dot data corresponding to the input character code from character generator 2A and converts this 11-bit dot data into the 28-bit dot data in accordance with the procedure shown in FIG. 7 and stores into printing buffer 14. In the case where the high resolution printing mode "B" is set, CPU 1 reads out the 32-bit dot data from character generator 2B and stores into printing buffer 14. Thermal head driver 15 drives thermal head 16 in accordance with the dot data stored in printing buffer 14. CPU 1 stops the operation of head driver 15 after an expiration of a predetermined time $t_1$ or $t_2$ ($>t_1$) which is decided in dependence on the high speed printing mode or high resolution printing mode, respectively. Thereafter, CPU 1 checks to see if all of the data to be printed in one line have been completely printed or not. If it is NO, the dot data of the next column is read out from one of character generators 2A and 2B corresponding to the printing mode which is at present set and the operation similar to the above is executed. After completion of the printing of one line, a check is made to see if all of the character data designated by a command from host computer 12 have been printed or not. If it is NO, the ribbon end is again checked. After completion of the printing of all of the character data, the printing operation corresponding to the printing command from host computer in this cycle is finished.

Figure 7:
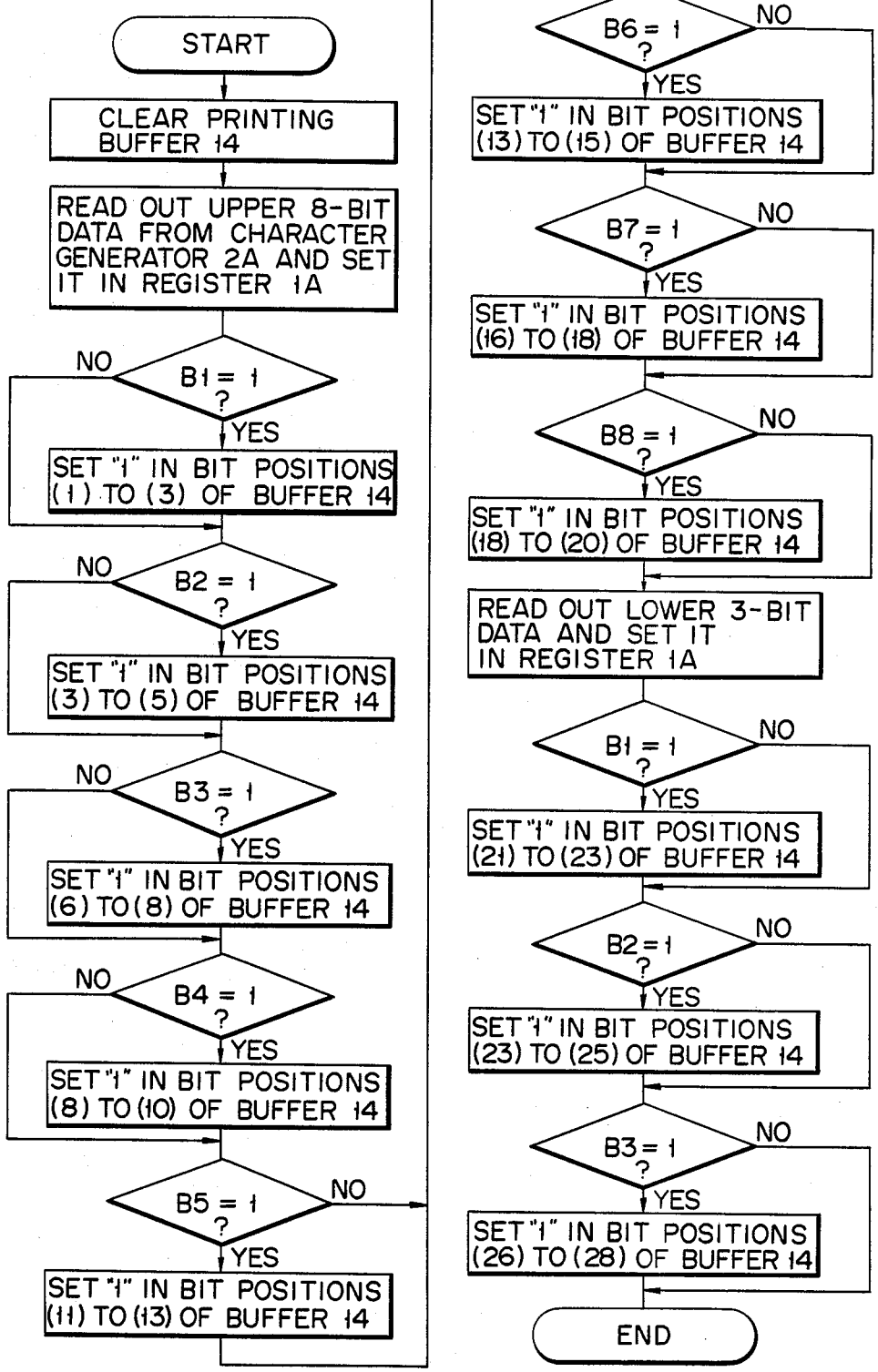
FIG. 7 is a flowchart for explaining the data conversion routine in the flowchart shown in FIG. 6.

FIG. 7 is a flowchart showing the procedure to convert the character data read out from character generator 2A into the 28-bit dot data in the high speed printing mode. First, "0" is written in all bit positions [1] to [32] of printing buffer 14. Next, CPU 1 reads out upper eight bits of the 11-bit dot data from character generator 2A and stores into auxiliary register 1A. When bit B1 at the first bit position in auxiliary register 1A is "1", "1" is stored in bit positions [1] to [3] of printing buffer 14. Similarly, when bits $B_2$ to $B_8$ at the second to eighth bit positions in auxiliary register 1A are "1", "1" is written in bit positions [3] to [5]; [6] to [8]; [8] to [10]; [11] to [13]; [13] to [15]; [16] to [18]; and [18] to [20] of printing buffer 14, respectively. For instance, when the 8-bit data from character generator 2A is "10101001", the bit data of "11100111001110000111" is written in bit positions [1] to [20] of buffer 14. Next, CPU 1 reads out lower three bits of the 11-bit data from character generator 2A and stores in the first to third bit positions in auxiliary register 1A. When bits $B_1$ to $B_3$ at the first to third bit positions in auxiliary register 1A are "1", "1" is stored in bit positions [21] to [23]; [23] to [25]; and [26] to [28] of printing buffer 14, respectively. In this way, the 11-bit data from character generator 2A is converted to the 28-bit data having substantially the same content as the 11-bit data and stored into buffer 14. For instance, when the 3-bit data from character generator 2A is "010", the dot data of "00111000" is written in bit positions [21] to [28] in buffer 14. Thus, the character or characters designated by the input character code are printed by composite heating elements $CH_1$ to $CH_{11}$.

As described above, in the embodiment, the character data is printed at the dot pitch of 1/180 inch in the high resolution printing mode, and the character data is printed at the dot pitch of 1/72 inch different from the dot pitch which is integer times the 1/180 inch in the high speed printing mode.

Although the invention has been described above with respect to the embodiment, the invention is not limited to only this embodiment. For example, in the above embodiment, the composite heating elements were formed using heating elements $HG_1$ to $HG_{28}$ in a manner such that the mean value of the dot pitches becomes 1/72 inch. However, in place of this or in addition to this constitution, it is also possible to form the composite heating elements such that the mean value of the dot pitches becomes 1/144 inch by selectively using heating elements $HG_1$ to $HG_{32}$. The pitch between dots is not necessarily limited to 1/180 inch, 1/72 inch, or the like but may be set to a proper value as necessary.

On one hand, the character data can be also directly printed on a thermal paper without using an ink ribbon. In this case, sensor 18 can be omitted.

Further, although key 17 was used to set the printing mode, the printing mode setting data may be also generated from host computer 12 in place of key 17.

What is claimed is:

1. A thermal printer comprising:
   a thermal head having a plurality of heating elements arranged at a preset pitch D1 in a line;
   memory means including a first memory area in which a plurality of high speed printing character data each column of which is composed of n-bit data are stored and a second memory area in which a plurality of high resolution printing character data each column of which is composed of m-bit data (m>n) are stored; and
   printing control means for reading out the m-bit data of each column designated by an input character code data from said second memory area in accordance with a high resolution printing mode designation data, for selectively energizing the heating elements of said thermal head to execute a high resolution printing in accordance with said m-bit data read out, and also for reading out the n-bit data of each column designated by an input character code data from said first memory area in accordance with a high speed printing mode designation data, for converting said n-bit data into N-bit data (N>n) corresponding to the n-bit data, for selectively energizing the heating elements of said thermal head to execute a high speed printing at an average pitch D2 (D2 is larger than D1 and different from the integer multiple of D1) between adjacent dots in accordance with said N-bit data.

2. A thermal printer according to claim 1, wherein said printing control means includes a printing buffer for storing printing data; head drive means for selectively energizing the heating elements of said thermal head in accordance with the dot data stored in said printing buffer; and a control unit which reads out the m-bit data of each column designated by the input character code data from said second memory area in accordance with the high resolution printing mode designation data and stores into said printing buffer, and also reads out the n-bit data of each column designated by the input character code data from said first memory area in accordance with the high speed printing mode designation data and converts said n-bit data into the corresponding N-bit data and then stores into the printing buffer.

3. A thermal printer according to claim 2, wherein said printing mode designation data is generated from a printing mode setting key.

4. A thermal printer according to claim 2, wherein said printing mode designation data is generated from data generating means together with said character code data.

5. A thermal printer according to claim 1, wherein said printing mode designation data is generated from a printing mode setting key.

6. A thermal printer according to claim 1, wherein said printing mode designation data is generated from data generating means together with said character code data.

* * * * *